(12) United States Patent
Matsui et al.

(10) Patent No.: US 7,518,783 B2
(45) Date of Patent: Apr. 14, 2009

(54) ELEMENT FOR MODULATING AREA

(75) Inventors: Eriko Matsui, Tokyo (JP); Haruo Watanabe, Kanagawa (JP); Nobuyuki Matsuzawa, Plochingen (DE); Akio Yasuda, Esslingen (DE); Tadashi Mizutani, Osaka (JP); Takae Yamauchi, Kyoto (JP); Susumu Kitagawa, Osaka (JP)

(73) Assignees: Sony Corporation, Tokyo (JP); Sony Deutschland, Cologne (DE)

( * ) Notice: Subject to any disclaimer, the term of this patent is extended or adjusted under 35 U.S.C. 154(b) by 0 days.

(21) Appl. No.: 10/598,774

(22) PCT Filed: Mar. 8, 2005

(86) PCT No.: PCT/JP2005/004388

§ 371 (c)(1),
(2), (4) Date: Nov. 3, 2006

(87) PCT Pub. No.: WO2005/087653

PCT Pub. Date: Sep. 22, 2005

(65) Prior Publication Data

US 2007/0159572 A1    Jul. 12, 2007

(30) Foreign Application Priority Data

Mar. 12, 2004    (JP)    ............... 2004-070192

(51) Int. Cl.
*G02F 1/00* (2006.01)
*G02F 1/061* (2006.01)
*C09K 19/02* (2006.01)

(52) U.S. Cl. .................. 359/321; 359/322; 349/182

(58) Field of Classification Search .................. 349/170, 349/183, 182; 257/E29.323; 359/321, 322
See application file for complete search history.

(56) References Cited

U.S. PATENT DOCUMENTS 6,128,214 A    10/2000    Kuekes et al.
6,256,767 B1    7/2001    Kuekes et al.

(Continued)

FOREIGN PATENT DOCUMENTS

JP    6-509953    10/1994

(Continued)

OTHER PUBLICATIONS

Lukas, A.S., Wasielewski, M.R., Approaches to a Molecular Switch Using Photoinduced Electron and Energy Transfer, Molecular Switches, 2001, pp. 1-3, Wiley-VCH GmbH, Weinheim, Germany.

(Continued)

*Primary Examiner*—Evan Pert
(74) *Attorney, Agent, or Firm*—K & L Gates LLP

(57) ABSTRACT

An element for modulating an area is provided. The element for modulating area, in which there is used a functional molecular element adapted to change, by application of electric field, conformation of disc-shape like organic metallic complex molecule to exhibit function so that the structure of the organic metallic complex molecule is changed by application of electric field and the occupation area thereof is thus changed. The area modulating element is adapted to variously change molecular structure in accordance with control of applied electric field to change occupation area of molecule to thereby constitute a functional device such as optical filter and/or optical screen, etc.

3 Claims, 5 Drawing Sheets

U.S. PATENT DOCUMENTS

| | | | | |
|---|---|---|---|---|
| 6,756,720 | B2* | 6/2004 | Sakai | 310/364 |
| 2002/0015131 | A1* | 2/2002 | Sato | 349/177 |
| 2003/0107701 | A1 | 6/2003 | Shimoshikiryo et al. | |

FOREIGN PATENT DOCUMENTS

| | | |
|---|---|---|
| JP | 2003-218360 | 7/2003 |
| JP | 7-113995 | 9/2006 |

OTHER PUBLICATIONS

Irie, M., Photoswitchable Molecular Systems Based on Diarylethenes, Molecular Switches, 2001, pp. 37-38, Wiley-VCH GmbH, Weinheim, Germany.

Mrozek, T., Daub, J., Ajayaghosh, A., Optoelectronic Molecular Switches Based on Dihydoazulene-Vinylheptafulvene (DHA-VHF), Molecular Switches, 2001, pp. 63-67, Wiley-VCH GmbH, Weinheim, Germany.

Ikeda, T., Kanazawa, A., Liquid Crytal Photonics: Opto-photochemical Effects in Photoresponsive Liquid Crystals, Molecular Switches, 2001, pp. 363-364, Wiley-VCH GmbH, Weinheim, Germany.

Yo Shimizu "Columnar Liquid Crystals: Versatile molecular structures thereof and Intermolecular interaction," Liquid Crystals, 2002, Vo. 6, pp. 147-159.

Lizhen Ruan et al., "The effect of an electric filed on a homeotropically aligned smectic C liquid crystal" Liquid Crystal, vol. 18, No. 1, pp. 81-86.

Jose A.S. Cavaleiro et al., Tetrahedron Letters, vol. 33, No. 45, pp. 6871-6874, Nov. 3, 1992.

Haase W. et al., Enhanced Conductivity and Dielectric Absorption in Discotic Liquid Crystalline Columnar Phases of a Vanadyl Complex, written by Liquid Crystals, vol. 29, No. 1, 2002, pp. 133-139.

Kim Ki et al., "Effects of Applied Electric Field on Orientational Photorefraction in Porphyrin: Zn-doped Nematic Liquid Crystals," written by Institute of Physics, Melville, NY, vol. 85, No. 3, Jan. 1, 2004, pp. 366-368.

S.T. Kraka; H-F Hsu and T.M. Swager: "Cooperative Chirality in Columnar Liquid Crystals: Studies of Fluxional Octahedral Metallomesogens," written by J. Am, Chem. Soc., vol. 121, 1999, pp. 4518-4519.

* cited by examiner

FIG. 1A
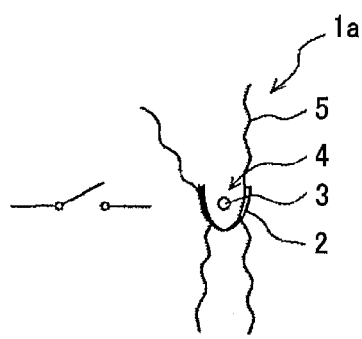
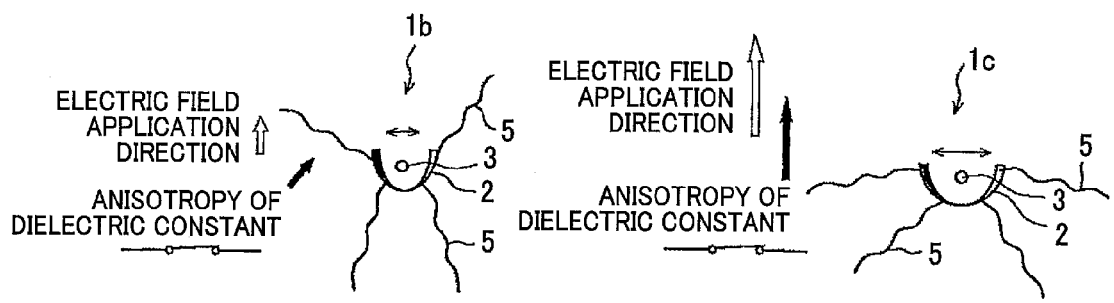
FIG. 1B          FIG. 1C

BILADIENONE METALLIC COMPLEX IN WHICH SUBSTITUENT (R) IS INTRODUCED

R: SUBSTITUENT, e.g., C10H21

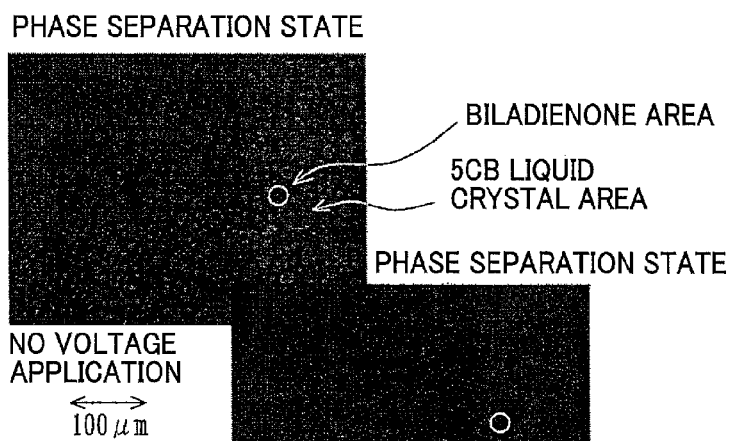
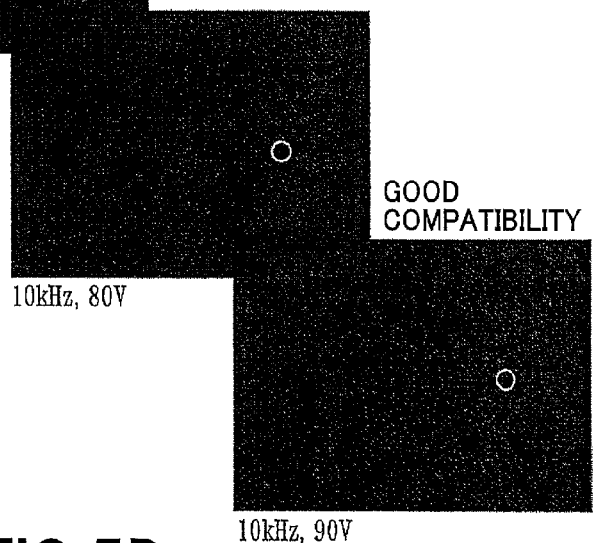
FIG.5A
FIG.5B
FIG.5C
FIG.5D

ELEMENT FOR MODULATING AREA

CROSS REFERENCE TO RELATED APPLICATIONS

The present application claims priority to Japanese Patent Document No. 2004-070192 filed on Mar. 12, 2004, the disclosure of which is herein incorporated by reference.

BACKGROUND

The present invention relates to a novel element for modulating area which exhibits function under action (application) of electric field.

In general, nano-technology is recognized as technology for observing, preparing (manufacturing) and utilizing fine structure having size of the order of one hundred millionth ($10^{-8}$ m=10 nm).

In the latter half of the year of 1980, ultra-high precision microscopes called scanning type tunnel microscopes have been invented so that one atom and/or one molecule can be observed. If such scanning type tunnel microscopes are used, not only atoms or molecules can be observed, but also atoms or molecules can be operated (manipulated) one by one.

For example, the example where atoms are arranged on the surface of crystal to write characters, and the like have been reported. However, even if it can be said that atoms or molecules can be operated or manipulated, it is not practical to operate or manipulate, one by one, a huge number of atoms or molecules to assemble new materials (substances) or devices.

In order to operate or manipulate atoms or molecules, or cluster thereof to form a structure of the nanometer size, a new ultra precision processing technology to realize such a structure is required. As such a fine processing technology of the nanometer precision, two systems are know when roughly classified.

One system is a method conventionally used in manufacturing processes for various semiconductor devices. This method is, e.g., such a method of the so-called top-down type to precisely shave a large silicon wafer down to the minimum size to prepare integrated circuits. The other system is a method of the bottom-up type to assemble atoms or molecules as small parts or components serving as micro (very small) unit to manufacture a target nano-structure.

In connection with the limit as to what structure of small size can be manufactured by the top-down system, there is the famous Moore's Law that Gordon Moore who is co-creator of Intel Corporation has presented in 1965. This rule is the content that "the degree of integration of transistor becomes double in eighteen months". Since 1965 (year), the semiconductor business world has enhanced degree of integration of transistor in accordance with the Moore's Law over thirty years.

International Technology Roadmap for Semiconductor (ITRS) for fifteen years in future announced from the U.S. Semiconductor Industrial Associates (SIA) indicates the opinion that the Moore's Law is continuously valid.

The ITRS consists of short-range roadmap until 2005 (year) and long-range roadmap until 2014 (year). In accordance with the short-range roadmap, process rule of the semiconductor chip is assumed to become equal to the order of 100 nm and the gate length of the microprocessor is assumed to become equal to 65 nm in 2005. In accordance with the long-range roadmap, the gate length is assumed to become equal to 20 through 22 nm in 2014.

As miniaturization of the semiconductor chip is advanced, operating speed becomes high and power consumption is suppressed accordingly at the same time. Further, the number of products (chips) taken from a single wafer and the production cost is also lowered. This is because makers for microprocessors compete the process rule and the degree of transistor integration of new products.

On November in 1999, the research group of USA indicated epoch-making research result of miniaturization technology. The research result is directed to a method of designing gate of FET (Field Effect Transistor) called FinFET, which has been developed by the group including Professor Chainmin Fuh, et al. who is in charge of Computer Science at Barkley School of California University. This method enables formation of transistors which are 400 times greater than that in the prior art on a semiconductor chip.

The gate is an electrode for controlling flow of electrons at the channel of FET, and is caused to be of structure, according to present typical design, in which the gate is placed in parallel to the surface of the semiconductor and serves to control the channel from one side. In this structure, it was considered that since if the gate has not a predetermined length or more, it is impossible to cut off (interrupt) flow of electrons, gate length therefore constitutes one cause (factor) to limit miniaturization of transistor.

On the contrary, in the case of the FinFET, the gate is caused to be of fork type bridging over both sides of the channel to effectively control the channel. In the structure of the FinFET, the gate length and the transistor can be further reduced as compared to the conventional structure.

The gate length of the FET of the prototype that the same research group as above has manufactured is 18 nm, which is one tenth of present typical gate length. This gate length is equivalent to the size in 2014 (year), which is indicated by the long-range roadmap of ITRS. Further, it is said that gate length which is one half thereof may be realized. Since Fuh, et al. do not have intention to acquire the Patent in anticipation that such structure will be widely employed in the semiconductor business world, there is also the possibility that the FinFET may also become main current of the manufacturing technology.

However, it is also pointed out that "Moore's Law" might reach the limit based on the natural law after all.

For example, in the semiconductor technology which is main current at present, circuit patterns are baked on silicon wafer by the lithography technology to manufacture semiconductor chip. In order to realize further miniaturization (fine structure), resolution must be increased. In order to increase resolution, a technology utilizing light having shorter wavelength must be put into practice.

Moreover, calorific value per semiconductor chip may become too large with increase of the degree of integration. As a result, the semiconductor chip caused to have high temperature may be erroneously operated, or thermally broken.

Further, in accordance with prediction by the specialist, it is considered that when the semiconductor business world continues to miniaturize (reduce) chip as it is, the facility cost and/or the process cost are increased so that manufacturing of semiconductor chip might become impossible from an economical point of view in about 2015 also since deterioration of yield is invited in addition to the above.

As a new technology for overcoming technical obstacle of the top-down system as described above, the spotlight of attention is focused on research for allowing individual molecules to have functions as electronic parts (components). Devices based on such research or study are electronic device consisting of single molecule (molecular switch, etc.), and are manufactured (fabricated) by the bottom-up system.

Also with respect to metal, ceramics and/or semiconductor, researches (studies) for preparing (manufacturing) structure of nano-meter size by the bottom-top system are being performed. However, if attention is drawn to molecules which are primarily and individually independent and have variety to the number of about several million kinds in difference of shape and/or difference of function, etc. to exhibit the properties thereof, it is possible to design, by the bottom-up system, devices (molecular devices) having features entirely different from conventional devices to manufacture such devices.

For example, width of conductive molecule is only 0.5 nm. Wire of this molecule enables realization of wiring having density which is several thousands times than that of line width of about 100 nm which is realized by the present integrated circuit technology. Moreover, when, e.g. one molecule is used as memory element (device), recording which is ten thousands times or more than that of DVD (Digital Versatile Disc) can be made.

Molecular devices are synthesized by chemical process differently from the conventional semiconductor silicon. In 1986, Yuji Hizuka of Mitsubishi Denki Kabushiki Kaisha has developed the first organic transistor consisting of polythiophene (polymer) in the world.

Further, search group of U.S. Hewlett-Packard (HP) Corporation and Los Angeles school of California University succeed manufacturing of organic electronic device and announced the content thereof in Science Magazine on July in 1999. Such organic devices are disclosed in U.S. Pat. No. 6,256,767 specification and U.S. Pat. No. 6,128,214 specification. They made (fabricated) switches by using molecular films consisting of several millions of rotaxane as organic molecule to connect these molecular switches to make AND gate serving as a basic logical circuit.

In addition, cooperative search group of the Rice University and the Yale University in U.S.A. succeeded to make molecular switch in which molecular structure is changed by electron injection under application of electric field to perform switching operation and announced such molecular switch on the Science Magazine on November in 1999 (J. Chen, M. A. Reed, A. M. Rawlett and J. M. Tour, "Large on-off ratios and negative differential resistance in a molecular electronic device", Science, 1999, Vol. 286, 1551-1552, J. Chen, M. A. Reed, C. Zhou, C. J. Muller, T. P. Burgin and J. M. Tour, "Conductance of a molecular junction", Science, 1997, Vol. 278, 252-2). The function to repeatedly perform on-off operation is a function which was not realized by the group of HP (Hewlett-Packard) Corporation and Los Angeles school of California University. The size thereof is one millionth of ordinary transistor, and constitutes basis for manufacturing small and high performance computer.

Professor J. Tour (Rice University, Chemistry) who succeeded synthesis stated that since high cost clean room used for ordinary semiconductor manufacturing process is unnecessary, production cost of molecular switch can be reduced down to one several ten thousandth of prior art. Within five to ten years, he has a schedule to make hybrid type computer of molecule and silicon.

In 1999, Bell Laboratory (Lucent Technology Corporation) fabricated organic thin film transistor by using pentacene single crystal. This organic thin film transistor exhibited the characteristic equivalent to inorganic semiconductor.

Although it is said that studies or researches of molecular device having a function as electronic component are extensively being performed, most of studies relating to molecular devices until now were directed to studies in which drive is performed by light, heat, proton or ion, etc. (Ben L. Feringa, "Molecular Switches", WILEY-VCH, Weinheim, 2001).

As conventional molecular element driven by electric field, there only existed element utilizing change of material property of molecule itself which has been caused to undergo action (application) of electric field, i.e., element in which electronic state of molecule itself considered to be single element is changed by electric field. For example, in organic FET, carrier transfer (movement) in organic molecule is modulated by change of electric field exerted on organic molecule within the channel area.

In view of actual circumstances as described above, an object of the present invention is to provide a functional molecular element (device) effectively controlled by electric field on the basis of a new principle.

SUMMARY

The present invention is directed to an element for modulating area using the system in which occupation area is changed by molecular structure change induced by electric field. Here, the "element" is a concept including not only structure in which molecular structure takes place, but also device additionally provided with electrode, etc.

In accordance with the present invention, since element for modulating area is constituted by using the system in which occupation area of molecule to be used is changed (modulated) by molecular structure change induced by electric field, molecular structure is variously changed by control of electric field to be applied to change occupation area, thereby making it possible to obtain functional device such as optical filter or optical screen, etc.

Such mechanism for applying electric field is directed to a mechanism to directly control, by structure change of molecule based on electric field, the occupation area thereof, and is not found out in conventional functional molecular element or device. On the basis of new electric field applying mechanism, it is possible to constitute element for modulating area which can control occupation area of molecule with high response of electric field.

Still further objects of the present invention and merits obtained by the present invention will become more apparent from embodiments which will be explained below with reference to the attached drawings.

BRIEF DESCRIPTION OF THE FIGURES

FIGS. 1A to 1C are schematic diagrams illustrating three switching operation modes that functional molecular element according to the present invention indicates, wherein FIG. 1A shows the initial state where no electric field is applied, FIG. 1B shows the state where low electric field (voltage) is applied, and FIG. 1C shows the state where high electric filed (voltage) is applied.

FIG. 5 is microscopic observation photos indicating the relationship between compatibility and voltage of area modulating device according to the present invention.

DETAILED DESCRIPTION

Figure 2:
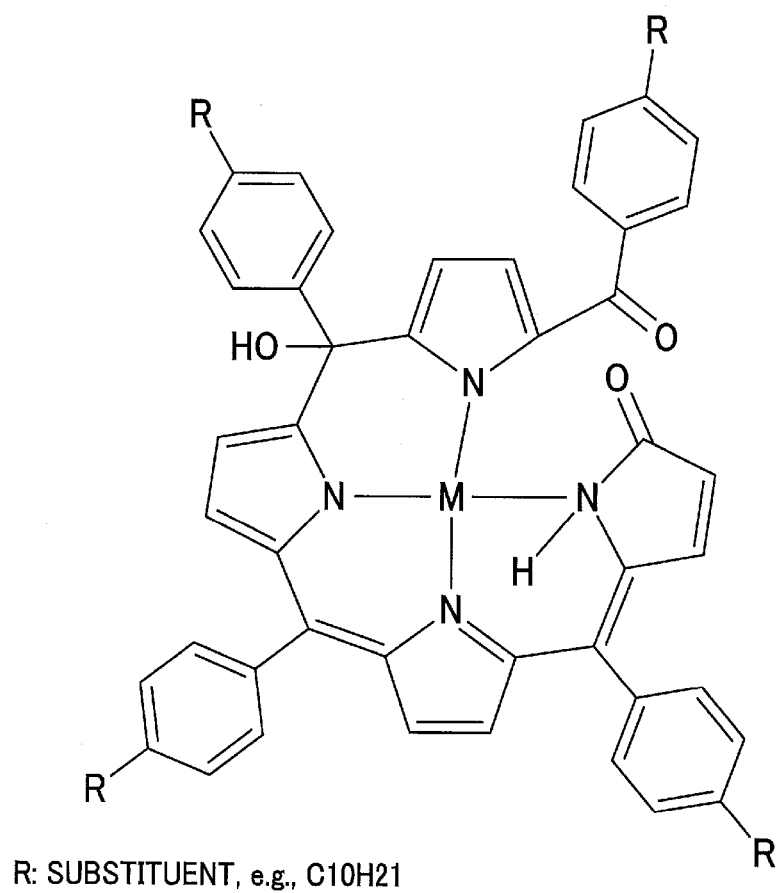
FIG. 2 is a view showing structural formula of biladienone metallic complex constituting functional molecular element.

As functional molecular element according to the present invention, it is preferable to use organic metallic complex molecule of desirably disc-shaped, or disc-shape like organic molecule and metal ion having, e.g., side chain in normal (straight) chain form having anisotropy of dielectric constant and adapted so that structure is changed under application of electric field. If organic molecule in a form similar to disc shape having such side chain is used, the property of discotic liquid crystal is indicated so that orientation of molecules takes place. Thus, anisotropy of high dielectric constant can be exhibited. With respect to this, there can be referred, 'S. T. Trzaka, H-F Hsu and T. M. Swager, "Cooperative Chiralith in Columnar Liquid Crystals: Studies of Fluxional Octahedral Metallomesogens.", J. Am. Chem. Soc., 1999, Vol. 121, 4518-4519, and Yo Shimizu "Columnar Liquid Crystals: Versatile molecular structures thereof and Intermolecular interaction", Liquid Crystals, 2002, Vol. 6, 147-159.

On the other hand, since the organic molecule has anisotropy of dielectric constant and the structure or orientation thereof is changed under application electric field so that conformation of portion where complex is formed, etc. is changed in correspondence with change of the electric field. Thus, anisotropy of dielectric constant, i.e., electric characteristic is changed.

Further, it is preferable that liquid crystal solution of disc-shape like organic metallic complex molecules having side chains is disposed between at least opposite electrodes in the state where orientation thereof is performed on the electrode for applying electric field. It is preferable that there is formed columnar arrangement structure in which disc-shape like organic metal complex molecule having side chain is arranged in columnar form between these pair of opposite electrodes.

Moreover, it is preferable that the structure of the organic metallic complex molecule is changed by change of an electric field exerted on disc-shape like organic metal complex molecule having side chain so that an angle that the major axis direction of the dielectric constant tensor and the formation plane surface of the pair of opposite electrodes form is changed.

In this case, it is preferable that solution of the organic metallic complex molecules having side chains is disposed on a first electrode for applying an electric field and a second electrode for applying an electric field is provided directly or through an insulating layer on the solution so that phase separation state of the solution is changed in correspondence with the electric field.

Moreover, it is preferable that disc-shape like organic molecule having side chain is biladienone derivative such as biliverdin or biladienone, etc., and metal ion is zinc ion, copper ion or nickel ion, etc. In addition to the biladienone derivative, there may be used bilin derivative, florine derivative or chlorine derivative, etc. As the above-mentioned metal, there may be used other typical element and/or transition metal.

Further, the side chain may have normal (straight) shape having the number of carbon atoms of 3 to 12. For example, —$C_{10}H_{21}$ or —$C_8H_{17}$ may be mentioned. By side chain having such number of carbon atoms, orientation of organic molecules may be satisfactorily performed without crystallization. Synthesis also becomes easy. Namely, when the number of carbon atoms is 1 to 2, organic molecule becomes easy to be crystallized so that material property like liquid crystal is not exhibited. As a result, unsatisfactory orientation takes place. Moreover, when the number of carbon atoms becomes equal to 13 or more, carbon is difficult to rather undergo orientation. Synthesis also becomes difficult.

Further, as solvent used in solution, there may be used, e.g., polar solvent such as biphenyl-system liquid crystal such as 4-pentyl-4'-cyanobiphenyl (5CB) or tetrahydrofuran, etc. It is preferable that concentration of organic molecule such as biladienone metallic complex, etc. in this solution is 0.1 to 80 weight %. Further, it is desirable that such concentration is 10 to 30 weight %.

It is to be noted that the above-described "area modulation element" is not limited to element constituted as element, but may also include molecular device as previously described in which such element is assembled (This similarly applies to hereinafter).

Then, preferred embodiments of the present invention will be explained in concrete terms with reference to the attached drawings.

Functional Molecular Element

In this embodiment, the present invention is applied to a functional molecular element. This functional molecular element is a molecular element in which three-dimensional structure is changed by application of an electric field to exhibit function. As an example of the function thereof, switching operation is conceivable. FIGS. 1A to 1C schematically illustrate, in a model form, change taking place at the periphery of metallic ions 3 at the time of applying an electric field to the functional molecular element 1 by taking an example of the functional molecular element 1 in which metallic ion 3 and disc-shape like organic molecule 2 having side chains 5 form complex formation part 4.

Since disc-shape like organic metallic complex molecule having side chains 5 (functional molecule 1) has plural activity portions with respect to metal 3, there exist plural structural isomers having production energies substantially equal to each other. In the initial state where no electric field (voltage) is applied as shown in FIG. 1A, the organic metallic complex molecule takes the form of structure 1a having lowest production energy.

When, e.g., low electric field (voltage) is applied, the functional molecule 1 performs structural change balanced with its production energy difference and applied electric field (voltage) strength in such a manner that there results structure 1b in which anisotropy of dielectric constant is along application electric field direction in attempting to allow dielectric constant anisotropy to be in correspondence with applied electric field direction as shown in FIG. 1B.

Further, when higher electric field (voltage) is applied, the organic metallic complex molecule performs structural change in such a manner that there results a structure 1c in which its production energy is high and dielectric constant anisotropy is caused to be, to more degree, in correspondence with electric field application direction as shown in FIG. 1C.

As stated above, with respect to dynamics of the switching operation that the functional molecule exhibits at the time of application of electric field, at least two kinds of operation modes shown in FIGS. 1B, 1C are conceivable depending upon difference of electric field strength. This will be further explained in detail.

In the initial state where no voltage is applied as shown in FIG. 1A, disc-shape like organic metallic complex molecule 1a having side chains 5 of the functional molecular element 1 attempts to take disc-shaped structure which is closed as close as possible.

When electric field (voltage) is applied as shown in FIG. 1B in this state, the disc-shape like organic metallic complex molecule 1 having side chains 5 attempts to take, e.g., opened (expanded) circular structure 1b in such a manner that direction of dielectric constant anisotropy attempts to become in correspondence with direction of electric field. Moreover, when higher electric field (voltage) is applied as shown in FIG. 1C, the structure of the organic metallic complex molecule 1 changes into extended circular structure 1c in a manner to allow direction of dielectric constant anisotropy to be further in correspondence with electric field application direction while production energy is higher than that at the time when no electric field is applied.

When such state is viewed as the entirety of column, there is performed a change as if spiral pitch expands or contracts.

As described above, the structure or orientation of disc-shape like organic metallic complex 1 having side chains is changed. This causes change in the structure of the complex formation part 4 with respect to metallic ion 3 to change dielectric constant of the functional molecule 1.

As the functional molecule 1, several combinations are conceivable depending upon difference of the configuration, etc. of disc-shape like organic molecule 2 having side chains 5 or complex formation part 4.

For example, FIG. 2 shows organic metallic complex molecule 1 of disc-shape like organic molecule 2 having side chains 5 consisting of substituent (R) (e.g., $-C_{10}H_{21}$), e.g., biladienone derivative having C=O group facing to each other at the terminal end thereof and metal ion (M), e.g., Zn (II) ion.

Figure 3:
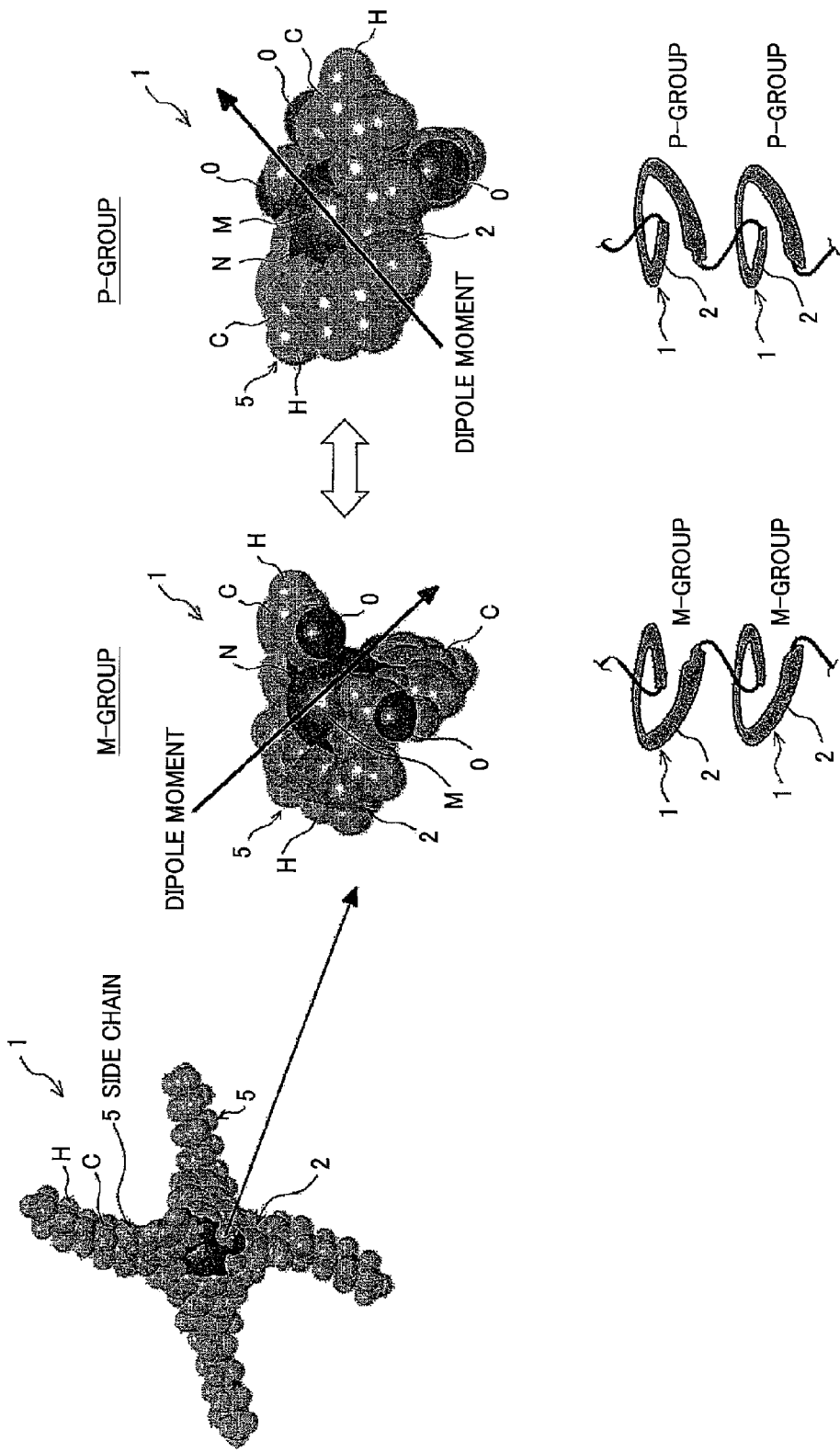
FIG. 3 is a model view showing model of chemical structure of biladienone metallic complex and spiral structure thereof.

In this organic metallic complex molecule 1, molecules take twisted structure by existence of C=O group (carbonyl group) of end terminals facing to each other, and plural molecule takes π-π stack structure therebetween to wind spiral. In FIG. 3, model of the molecular structure thereof is shown. In this case, the spiral structure is formed by optical isomer of M-group or P-group. Pitch between molecules of the spiral structure is changed by action (application) of electric field.

This organic metallic complex 1, e.g., biladienone metallic complex takes blue in the ordinary state where no electric field (voltage) is applied, and causes change of green→thin brown by application of electric field. In addition, when electric field is cut OFF, the organic metallic complex 1 reversibly returns to the original state. It is to be noted that such change takes place also by temperature, and it is therefore considered that when both electric field and temperature are controlled, molecular structure may be similarly changed.

Element for Modulating Area

Here, organic metallic complex molecule 1 consisting of biladienone 2 and zinc (II) ion as metallic ion 3 is used as the organic metallic complex molecule 1. A membrane area modulation device in which the organic metal complex molecule 1 is assembled and a manufacturing process thereof will be explained.

Figure 4:
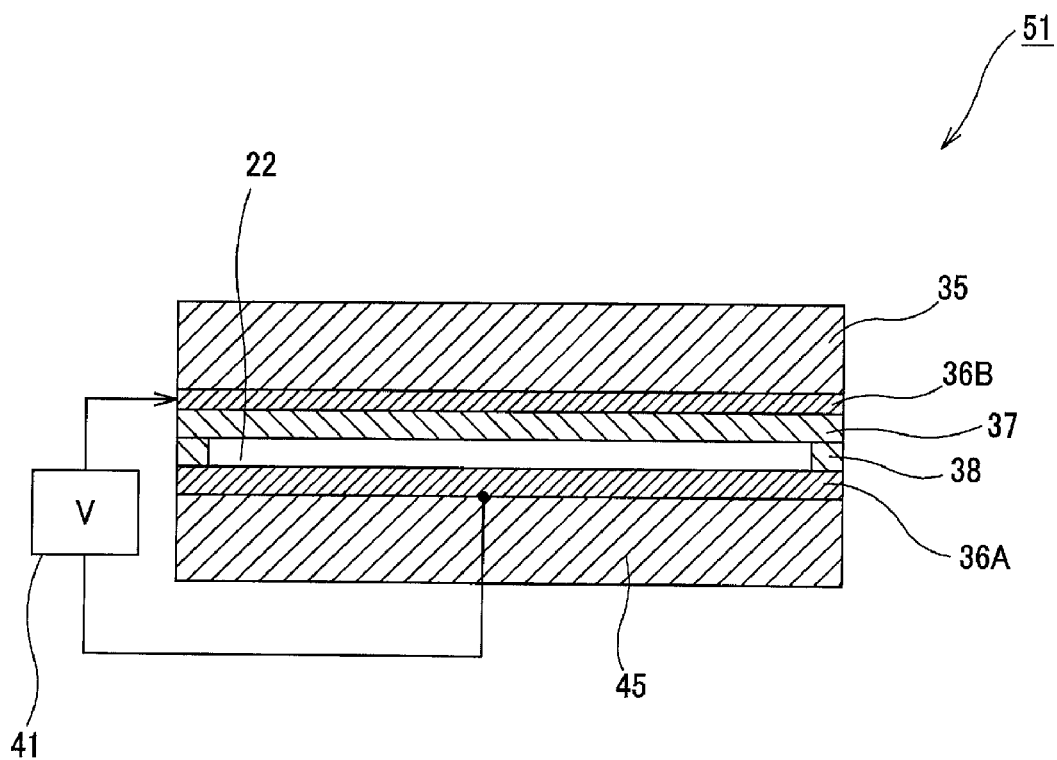
FIG. 4 is a schematic cross sectional view showing membrane area modulating device.

FIG. 4 is a schematic cross sectional view showing the structure of a membrane area modulating device 51. In this area modulating device 51, ITO (Indium Tin Oxide) films 36A, 36B serving as electrode for applying control electric field are respectively formed on a first base (substrate) 45 and a second base (substrate) 35, and an insulating layer 37 is laminated on one ITO film. A liquid crystal solution 22 consisting of complex 1 of biladienone 2 and zinc (II) ion 3 and 4-pentyl-4'-cyanobiphenyl (5CB) is put along with spacer (of which illustration is omitted) between the two bases 45 and 35, and is sealed by a sealing material 38.

The ITO film 36A on the first base 45, which doubles as the electrode for applying control electric field, and the ITO film 36B serving as another electrode for applying control electric field are electrically connected to a power source (supply) 41 for applying control electric field.

The manufacturing process for the area modulating device 51 will be explained below.

First, control electric field applying electrodes for applying control electric field to the biladienone zinc complex 1 are fabricated. As the first and second bases 45 and 35, there is used, e.g., glass base (substrate) to form ITO (Indium Tin Oxide) films onto the surface thereof by vacuum deposition, etc. to allow these films to be electrodes 36A, 36B for applying control electric field.

Then, the insulating layer 37 such as polyvinyl alcohol, etc. is formed by coating, etc on the ITO film 36B of the second base 35. This insulating layer 37 may be liquid crystal orientation film by rubbing, etc.

Then, material for functional molecular element is assembled between the above-described electrodes 36A and 36B to fabricate main part of the area modulating device 51 capable of performing observation of area modulation.

First, biladienone metallic complex 1 is dissolved into 4-pentyl-4'-cyanobiphenyl (5CB) liquid crystal to coat this solution 22 onto the electrode 36A. The first and second bases 45 and 35 are stuck with each other so that the insulating layer 37 formed on the second base 35 comes into closely contact with the liquid crystal solution 22.

Finally, the periphery of the two bases 45 and 35 which have been stuck with each other is sealed by sealing material 38 to complete the area modulating device 51.

When voltage applied across the control electric field applying electrodes 36A and 36B of the area modulating device 51 fabricated in this way is caused to be turned ON and OFF to perform microscopic observation, area modulation action is observed as shown in FIG. 5.

Namely, as shown at (a) in FIG. 5, at the time when power is in OFF state, phase separation between biladienone area and 5CB liquid crystal area is clearly performed so that the 5CB liquid crystal area is observed as relatively large area. On the contrary, when applied voltage is 70V, the first structural change takes place as shown at (b) in FIG. 5 so that melting of phase is started. When applied voltage is 80V, the second structural change takes place as shown at (c) in FIG. 5 so that two phases are further molten. When applied voltage is 90V, the third structural change takes place as shown at (d) in FIG. 5 so that good compatibility is exhibited. In this process, there is reversible characteristic such that color of the solution changes in a manner of blue→thin green, but state thereof returns to the original state when voltage application is cut off.

This is because the structure of disc-shape like organic metallic complex molecule 1 is changed by application of electric field with respect to the electric field direction as shown in FIGS. 1 and 3 to modulate the structure of complex molecule to change phase separation state (occupation area of molecule). Thus, novel area modulating element can be provided.

When such area modulating device is utilized, the following use purposes are conceivable.

1) Filter use purpose: Control between hydrophilic characteristic (when electric field is in ON state) and hydrophobic characteristic (when electric field is in OFF state) is performed so that the area modulating device can be used as filter. As the result of the fact that such switching operation can be controlled by electric field, there is conceivable use purpose such that because hole (gap between organic metallic complex molecules) is clogged (closed) under application of excessive electric field, hydrophilic ion (Li, etc.) stops flowing (in upper and lower directions of FIG. 4), so overvoltage can be prevented in the case where such area modulating device is constituted as battery.

2) Optical use purpose: There can be used an optical screen for controlling light scattering by electric field.

Then, a practical embodiment of the present invention will now be explained in further detailed manner.

In the embodiment of the present invention, area modulating device 51 shown in FIG. 4 was fabricated. First, there were fabricated control electric field applying electrodes 36A and 36B for applying control electric field to the above-described biladienone metallic complex molecule 1.

After ITO transparent electrodes 36A, 36B as the control electric field applying electrodes are formed on first and second bases 45 and 35 (glass base) by vacuum deposition, insulating layer 37 is formed on the ITO transparent electrode 36B of the second base 35. As such material, there was selected polyvinyl alcohol. Then, 10 weight % aqueous solution of polyvinyl alcohol was prepared to coat the solution onto ITO by the spin-coat process to perform heat treatment for 30 minutes at 110° C. thereafter to dry it for 72 hours in vacuum.

Further, the first base 45 and the second base 35 were stuck with each other through spacer so that gap between both bases becomes equal to 10 µm.

Then, liquid crystal solution 22 consisting of zinc complex 1 of biladienone 2 and 4-pentyl-4'-cyanobiphenyl (5CB) is injected into the portion between the first and second bases 45 and 35 by making use of the capillary phenomenon.

Finally, the peripheral portion of the two bases 45 and 35 which have been stuck with each other is sealed by sealing material 38 such as epoxy resin, etc. to complete area modulating device 51.

Bipolar high frequency (10 kHz) voltage applied across control electric field applying electrodes 36A and 36B of the area modulating device 51 fabricated in this way is caused to be turned ON/OFF to perform observation under microscope. As a result, as shown in FIG. 5, when electric field is in OFF state, compatibility between biladienone metallic complex and 5CB liquid crystal was bad so that phase separation is observed. However, that compatibility is changed by application of electric field so that the area modulating action in the micro area was observed. For example, respective areas of 5CB liquid crystal having diameter of 10 µm (φ10 µm) can be reduced to those areas having diameter of 1 µm (φ1 µm) or less by application of voltage. As a result, color was changed in a manner of blue→thin green every pixel shown. This phenomenon is useful as light switch or display.

Namely, when applied voltage is in OFF state, compatibility between biladienone metallic complex and 4-pentyl-4'-cyanobiphenyl (5CB) liquid crystal was bad so that phase separation is observed. On the contrary, when applied voltage is 70V, the first structural change takes place so that melting of phase is started. When applied voltage is 80V, the second structural change takes place so that two phase are further molten. When applied voltage is 90V, the third structural change takes place so that good compatibility is exhibited.

It is to be noted that while the present invention has been described in accordance with certain preferred embodiments thereof illustrated in the accompanying drawings and described in detail, it should be understood by those ordinarily skilled in the art that the invention is not limited to embodiments, but various modifications, alternative construction or equivalents can be implemented without departing from the scope and spirit of the present invention as set forth by appended claims.

INDUSTRIAL APPLICABILITY

The element for modulating area according to the present invention can be used as filter by control of hydrophilic characteristic (when electric field is in ON state) and hydrophobic characteristic (when electric field is in OFF state). In practical sense, the element for modulating area can be used as a filter for preventing overvoltage of battery. Further, the element for modulating area can be applied to an optical screen for controlling light scattering by electric field.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An element for modulating area comprising a system in which occupation area is changed by a molecular structure change induced by an electric field, wherein the area modulating element includes a complex of an organic molecule having an anisotropy of a dielectric constant and including side chains each of which structure is changed under an application of electric field, and a metallic ion.

2. The element for modulating area according to claim 1, wherein each side chain has a linear chain shape, and is substantially bonded to the organic molecule.

3. The element for modulating area according to claim 2, wherein a solution of organic metallic complex molecule that includes the organic molecule having the side chains is disposed on a first electrode for applying the electric field, and a second electrode for applying the electric field is provided on the solution directly or through an insulating layer, whereby a phase separation state of the solution is changed in correspondence with the electric field.

* * * * *